United States Patent
Miosi et al.

(10) Patent No.: US 10,703,503 B2
(45) Date of Patent: Jul. 7, 2020

(54) METHOD OF DISPLAYING DATA IN AN AIRCRAFT

(71) Applicant: General Electric Company, Schenectady, NY (US)

(72) Inventors: Jennifer Marie Miosi, Independence, KY (US); David Allen Bradford, Harrison, OH (US)

(73) Assignee: General Electric Company, Schenectady, NY (US)

( * ) Notice: Subject to any disclaimer, the term of this patent is extended or adjusted under 35 U.S.C. 154(b) by 382 days.

(21) Appl. No.: 15/585,525

(22) Filed: May 3, 2017

(65) Prior Publication Data

US 2018/0319509 A1  Nov. 8, 2018

(51) Int. Cl.
  *B64D 45/00* (2006.01)
  *B64D 27/16* (2006.01)
  *G01M 15/14* (2006.01)

(52) U.S. Cl.
  CPC ............. *B64D 45/00* (2013.01); *B64D 27/16* (2013.01); *B64D 2045/0085* (2013.01); *G01M 15/14* (2013.01)

(58) Field of Classification Search
  CPC ........... B64D 45/00; B64D 2045/0085; G01M 5/0066; G01M 15/12; G01M 15/14; F05B 2270/334
  See application file for complete search history.

(56) References Cited

U.S. PATENT DOCUMENTS

| | | | |
|---|---|---|---|
| 3,603,140 A | 9/1971 | Spencer | |
| 5,381,692 A | 1/1995 | Winslow et al. | |
| 6,909,948 B2 | 6/2005 | Mollmann et al. | |
| 7,428,475 B2 | 9/2008 | Kurt-Elli | |
| 7,640,802 B2 | 1/2010 | King et al. | |
| 7,997,140 B2 | 8/2011 | Perie | |
| 8,146,433 B2 | 4/2012 | Kishino et al. | |
| 8,720,275 B2 | 5/2014 | Heda et al. | |
| 2002/0158360 A1* | 10/2002 | Joseph | B29C 48/92 264/40.3 |
| 2004/0220709 A1* | 11/2004 | Mollmann | G01D 3/08 701/32.9 |
| 2005/0209823 A1* | 9/2005 | Nguyen | G05B 23/0221 702/185 |
| 2006/0136110 A1* | 6/2006 | Casey | B60G 17/0195 701/50 |
| 2008/0127734 A1* | 6/2008 | van der Merwe | G01H 1/003 73/660 |
| 2008/0243344 A1* | 10/2008 | Casey | B60G 17/0195 701/50 |
| 2012/0067113 A1* | 3/2012 | Jaffe | G01M 15/02 73/114.62 |

\* cited by examiner

*Primary Examiner* — Thomas G Black
*Assistant Examiner* — Ce Li Li
(74) *Attorney, Agent, or Firm* — McGarry Bair PC (57) ABSTRACT

A method and apparatus of displaying data in an aircraft, the method including receiving data, from at least one sensor operably coupled to the aircraft, averaging, by a control module, at least two data points of the received data to define a delta and averaged data, comparing, by the control module, the delta to a reference threshold value, and providing an indication, on a display of the aircraft, of the averaged data based on the comparing.

19 Claims, 7 Drawing Sheets

METHOD OF DISPLAYING DATA IN AN AIRCRAFT

BACKGROUND OF THE INVENTION

Contemporary aircraft can include displays for displaying graphical, textual, or decimal information to a user, pilot, or co-pilot. Such information can be provided or presented to a user to inform the user of the status of the aircraft or a system thereof.

Data displayed to the user, pilot, or co-pilot can be derived from or related to raw data value, including averaging a set of data values over a period of time. Averaging method utilizing a set number of samples can result in a longer "recovery time," that is, a delay in matching or "tracking" data values that have varied from previous data values in the averaging. The delay in matching or tracking the varied data values can result in a delay in representing accurate data displayed to the user, pilot, or co-pilot.

BRIEF DESCRIPTION OF THE INVENTION

In one aspect, the disclosure relates to a method of displaying data in an aircraft, the method including receiving data, from at least one sensor operably coupled to the aircraft, relevant to vibration of the aircraft during flight to define received data, averaging, by a control module, at least two data points of the received data to define a delta and averaged vibration data, comparing, by the control module, the delta to a reference threshold value, providing an indication, on a display of the aircraft, of the averaged vibration data based on the comparing, and repeating the receiving data, averaging, comparing, and providing an indication and where when the delta is above the reference threshold value the averaged vibration data is based on two data points and when the delta is below the reference threshold value subsequent averaging includes more than two data points.

In another aspect, the disclosure relates to a method of displaying data in an aircraft, the method including receiving data, from at least one sensor operably coupled to the aircraft, relevant to vibration of the aircraft during flight to define received data, determining, by a control module, a difference between two data points of the received data to define a delta, comparing, by the control module, the delta to a reference threshold value, averaging, by the control module, a predetermined number of data points based on the comparing to define averaged vibration data, and providing an indication, on a display of the aircraft, of the averaged vibration data.

In yet another aspect, the disclosure relates to a method of displaying data in an aircraft, the method including: a) receiving data, from at least one sensor operably coupled to the aircraft, relevant to vibration of the aircraft during flight to define received data, b) determining, by a control module, a difference between at least two data points of the received data to define a delta, c) comparing, by the control module, the delta to a reference delta threshold value, d) averaging, by the control module, a predetermined number of data points based on the comparing to define averaged vibration data, e) providing a decimal value, on a display of the aircraft, of the averaged vibration data, and f) repeating a)-e) to provide a rolling averaged vibration data.

DESCRIPTION OF EMBODIMENTS OF THE INVENTION

Aspects of the disclosure can be implemented in any environment using or utilizing a method or apparatus for averaging data over a period of time. While non-limiting aspects of the disclosure are described with respect to an aircraft engine, a fan, or the like, the disclosure is not so limited. Further non-limiting aspects of the disclosure can be implemented in, used by, or utilized by a system or set of systems configured for averaging data over a period of time. For example, such non-limiting systems can include performing some action or controlling a response to the method or apparatus for averaging data, such as displaying the averaged data, or automatically operating the system in response to exceeding or meeting a threshold value related to or relative to the averaged data values.

While "a set of" various elements will be described, it will be understood that "a set" can include any number of the respective elements, including only one element. As used herein, the terms "axial" or "axially" refer to a dimension along a longitudinal axis of an electric machine or along a longitudinal axis of a component disposed within the engine. As used herein, the terms "radial" or "radially" refer to a dimension extending between a center longitudinal axis of the engine, an outer rotational circumference, or a circular or annular component disposed within the engine. The use of the terms "proximal" or "proximally," either by themselves or in conjunction with the terms "radial" or "radially," refers to moving in a direction toward the center longitudinal axis, or a component being relatively closer to the center longitudinal axis as compared to another component.

All directional references (e.g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e. g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other.

As used herein, a "system" or a "controller module" can include at least one processor and memory. In another non-limiting example, a "system" or a "controller module" can be at least partially implemented in a logic device, such as a field-programmable gate array. Non-limiting examples of the memory can include Random Access Memory (RAM), Read-Only Memory (ROM), flash memory, or one or more different types of portable electronic memory, such as discs, DVDs, CD-ROMs, etc., or any suitable combination of these types of memory. The processor can be configured to run any suitable programs or executable instructions designed to carry out various methods, functionality, processing tasks, calculations, or the like, to enable or achieve the technical operations or operations described herein.

Also as used herein, while sensors can be described as "sensing" or "measuring" a respective value, sensing or measuring can include determining a value indicative of or related to the respective value, rather than directly sensing or measuring the value itself. The sensed or measured values can further be provided to additional components. For instance, the value can be provided to a controller module or processor, and the controller module or processor can perform processing on the value to determine a representative value or an electrical characteristic representative of said value.

The exemplary drawings are for purposes of illustration only and the dimensions, positions, order and relative sizes reflected in the drawings attached hereto can vary.

Figure 1:
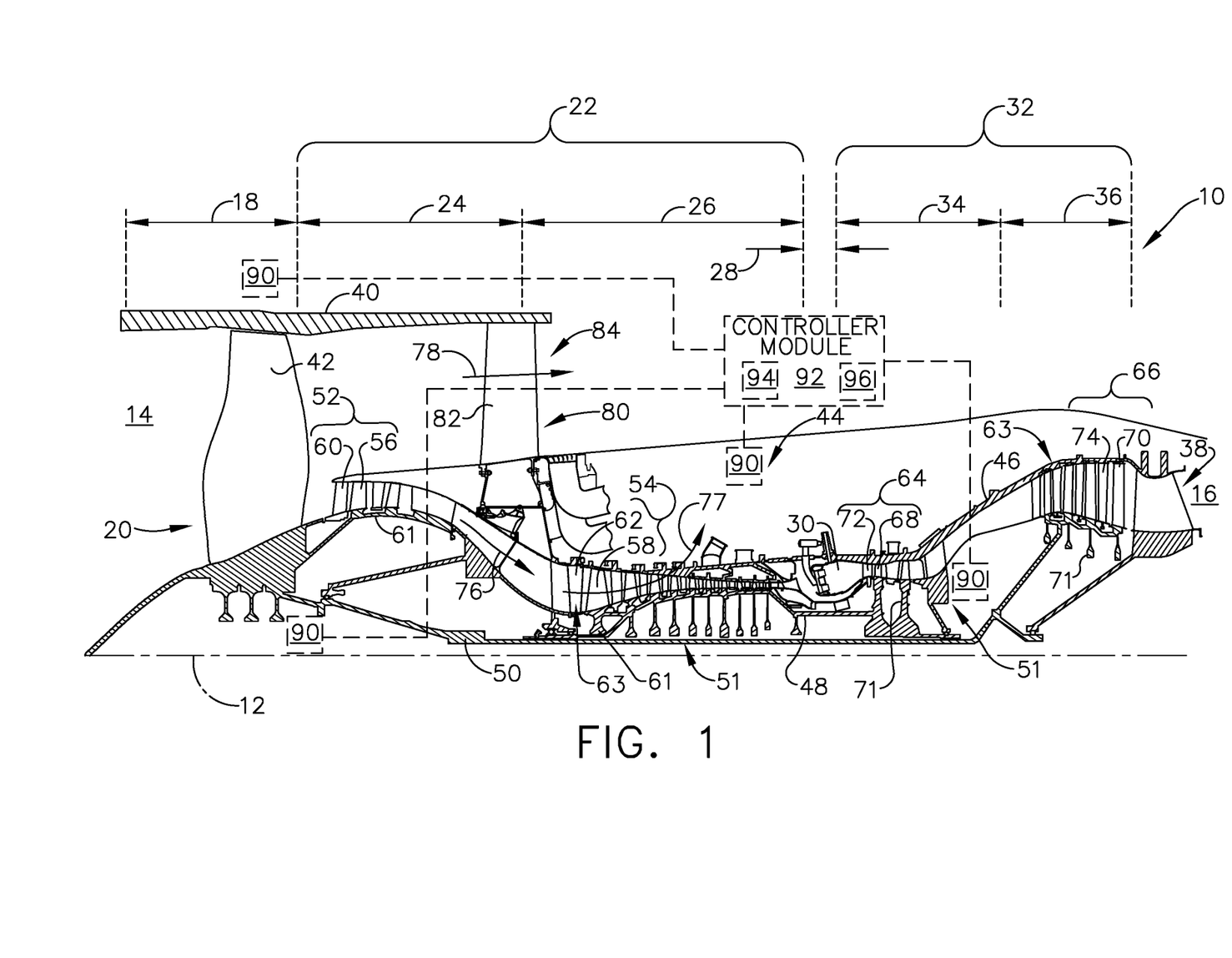
FIG. 1 is a schematic, sectional view of a turbine engine according to aspects of the disclosure described herein.

Non-limiting aspects of this disclosure can be directed toward a method of displaying data in an aircraft, and thus, a brief summary of a contemplated environment should aid in a more complete understanding. Thus, FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to a disk 61, which is mounted to the corresponding one of the HP and LP spools 48, 50, with each stage having its own disk 61. The vanes 60, 62 for a stage of the compressor can be mounted to the core casing 46 in a circumferential arrangement.

The HP turbine 34 and the LP turbine 36 respectively include a plurality of turbine stages 64, 66. A blade assembly includes a set of turbine blades 68, 70. The set of turbine blades 68, 70 are rotated relative to a corresponding nozzle assembly 73 which includes a set of turbine vanes 72, 74. The set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50, with each stage having a dedicated disk 71. The vanes 72, 74 for a stage of the compressor can be mounted to the core casing 46 in a circumferential arrangement.

Complementary to the rotor portion, the stationary portions of the engine 10, such as the static vanes 60, 62, 72, 74 among the compressor and turbine section 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized air 76 to the HP compressor 26, which further pressurizes the air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Aspects of the disclosure can further be included wherein sensor(s), such as a set of vibration sensors 90, can be included at, within, or operably coupled with the aircraft, or component thereof, such as the engine 10. The set of vibration sensors 90 can be utilized to sense or measure vibrations, including but not limited to a vibration level or a vibration value of the aircraft, the engine 10, or a component thereof. While a set of vibration sensors 90 are described, non-liming aspects of the disclosure can be included wherein the sensor is different type of sensor, including, but not limited to, an accelerometer, or another sensor that, for example, can be utilized to sense or measure movements or vibrations. Non-limiting aspects of the sensors can include any sensors configured or capable to provide data relevant to vibration of the aircraft during flight. Aspect of the disclosure can also include a controller module 92, illustrated schematically in dotted outline, and communicatively connected with the set of vibration sensors 90. The controller module 92 can include, for example, a processor 94 and a memory 96.

As shown, a non-limiting vibration sensor 90 can be disposed proximate to the fan blades 42, rotor 51, compressor section 22, turbine section 32, or the like. The set of vibration sensors 90 can be located to sense or measure vibrations over a period of time, relative to a particular component or section. The set of vibration sensors 90 can be configured to operably conduct or transmit a signal representative of the sensed or measured vibrations of the particular component or section to the controller module 92. The controller module 92 or the processor 94 can, in turn, perform, execute, or operate a set of functional instructions, methods, reports, effective operations, or the like, in response to the received vibration signals from the set of vibration sensors 90. While the controller module 92 is show schematically located proximate to the engine 10, aspects of the controller module 92 can be included wherein the controller module 92 is located proximate to, or remote from the engine 10.

Aspects of the disclosure can be included wherein the controller module 92 or the processor 94 performs a method for averaging the vibration signals received from one or more of the sensors of the set of vibration sensors 90 (hereafter, "the vibration data"). In non-limiting instances, the controller module 92 or the processor 94 can read, calculate, interpret, or report the vibration data, or a derivative thereof, to, for example, another aircraft system, another engine system, or to the cockpit. Vibration data provided to the cockpit can, for example, be displayed to a pilot or co-pilot, to provide a visual or numeric understanding of the data.

Figure 2:
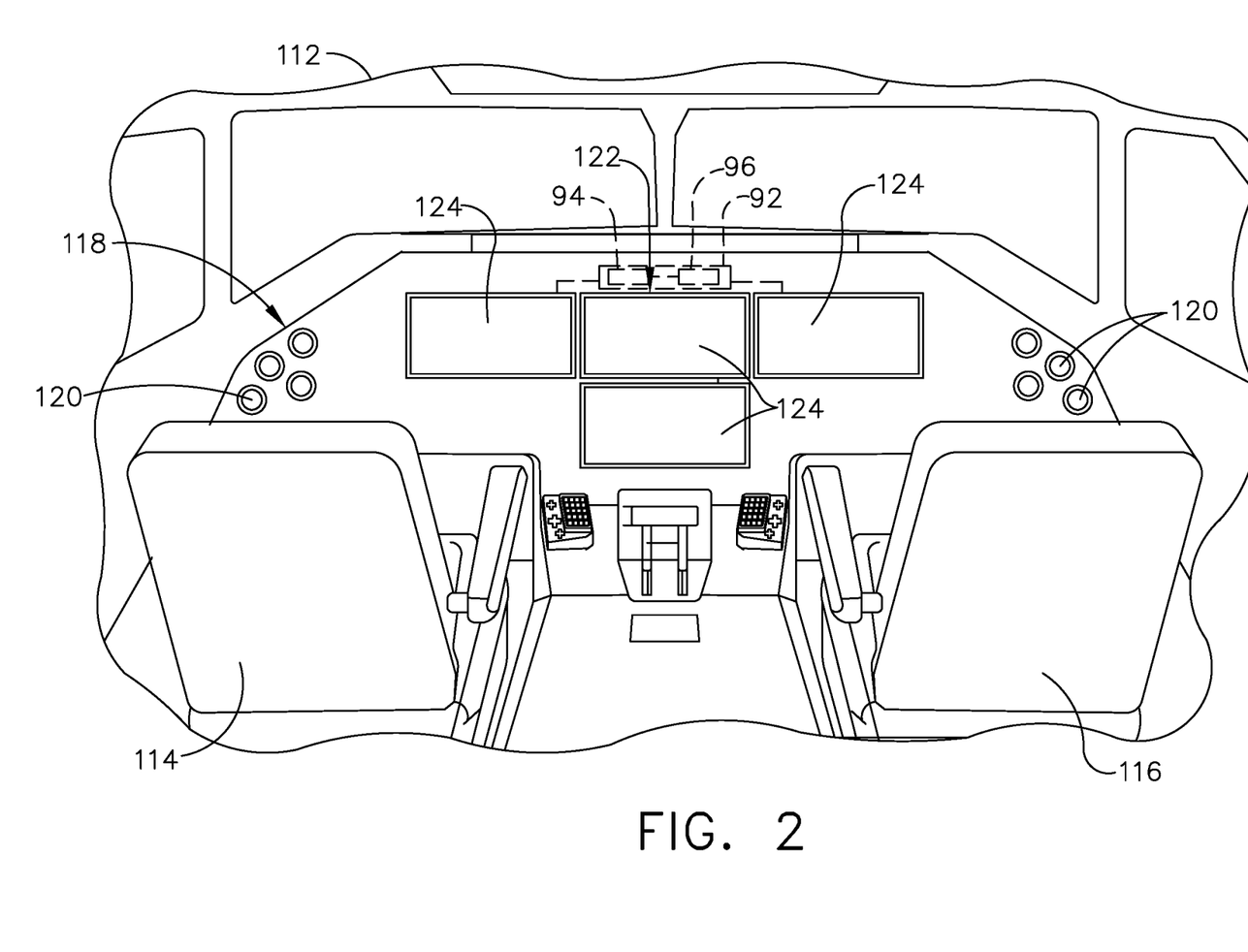
FIG. 2 is a perspective view of a portion of a cockpit including a display system.

FIG. 2 illustrates a non-limiting example of a portion of an aircraft cockpit 112. While a commercial aircraft has been illustrated, it is contemplated that aspects of the disclosure can be used in any type of legacy aircraft, for example, without limitation, fixed-wing, rotating-wing, rocket, personal aircraft, and military aircraft. A first user (e.g., a pilot) can be present in a seat 114 at the left side of the cockpit 112 and another user (e.g., a co-pilot) can be present at the right side of the cockpit 112 in a seat 116. A flight deck 118 having various instruments 120 and a display or display system 122. In one non-limiting aspect of the disclosure, the display system 122 can include multiple multifunction flight displays with display screens 124 that can be located in front of the pilot and co-pilot and can provide the flight crew with information to aid in flying the aircraft.

The flight displays with display screens 124 can include either primary flight displays or multi-function displays and can display a wide range of aircraft, flight, navigation, and other information used in the operation and control of the aircraft. Non-limiting aspects of the display screens 124 can be capable of displaying color graphics and text to a user, pilot, or co-pilot. The set of display screens 124 can be laid out in any manner including having fewer or more display screens 124, and need not be coplanar or the same size. A touch screen display or touch screen surface can be included in the display screens 124 and can be used by one or more flight crewmembers, including the pilot and co-pilot, to interact with the systems of the aircraft.

In another non-limiting aspect of the disclosure, the controller module 92 of FIG. 1 is shown schematically connected with at least one of the display system 122 or the set of display screens 124. In this sense, the controller module 92 or the processor 94 can be operably coupled to components of the cockpit 112 including, but not limited to, the display system 122 or the set of display screens 124.

Figure 3:
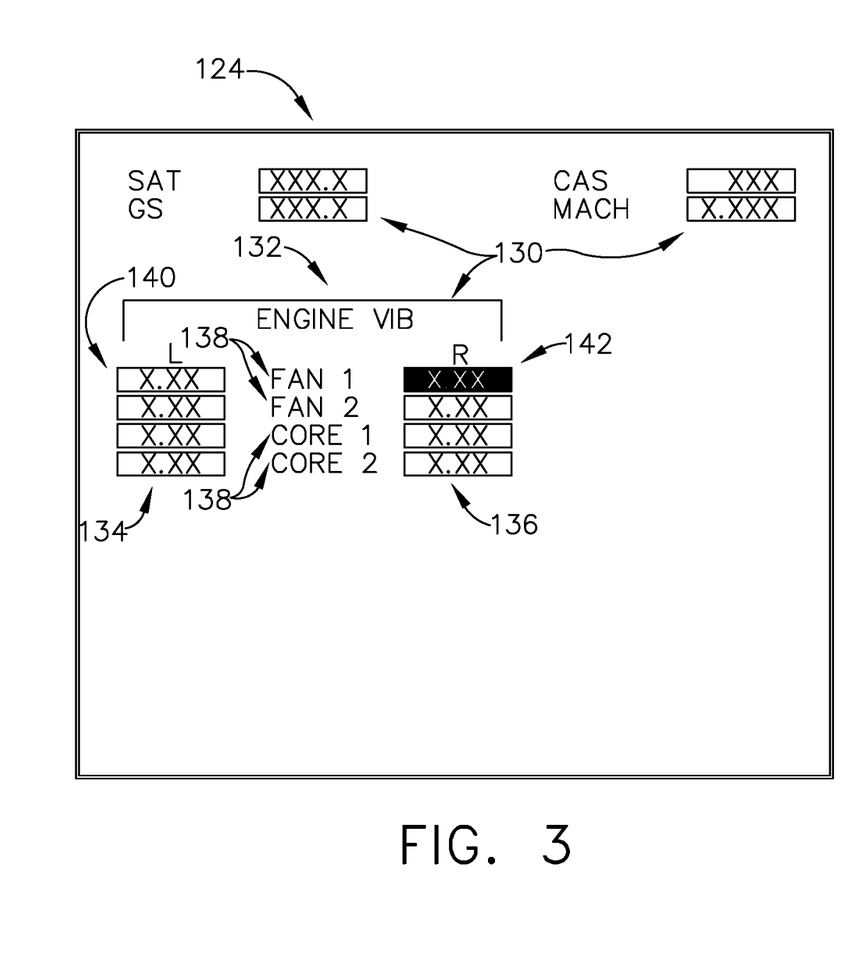
FIG. 3 is a perspective view of a display screen of the display system of FIG. 2, in accordance with various aspects described herein.

FIG. 3 illustrates a schematic view of at least one of the display screens 124 illustrated in FIG. 2. As shown, the display screen 124 can be configured, arranged, or segmented to provide a set of data, a set of data indicators, a set of data values, a set of text, a set of decimal values (i.e. illustrated as "X" values), or a combination thereof (collectively, "a set of data" 130). The set of data 130 can be formatted, arranged, or the like, to provide, display, or report the set of data 130 to the pilot or co-pilot. The illustrated example of the set of data 130 is merely one non-limiting example of data included or reported, and alternative display screens 124 or alternative set of data 130 arrangement is envisioned with aspects of the disclosure.

As shown, at least one set of data 130 can include vibration data, such as engine vibration data 132 (abbreviated in FIG. 3 as "ENGINE VIB"). Non-limiting aspects of the engine vibration data 132 can further include a set of vibration data 138 received from, for instance, the set of vibration sensors 90 disposed at relative points in the engine 10. Additional non-limiting aspects of the engine vibration data 132 can also be arranged, segmented, or formatted in accordance with additional classifiers, including a left engine set of data 134 or a right engine set of data 136.

Non-limiting aspects of the disclosure can be included wherein a subset of the data 130, including the engine vibration data 132 or a subset of the vibration data 138, can be highlighted, specifically indicated, or otherwise "stand out" when compared with the set of data 130, engine vibration data 132, or vibration data 138. In one non-limiting aspect of the disclosure, a first subset of data 140 is shown in a "normal" or "not indicating" state, that is, not specifically highlighting the first subset of data 140 compared with the majority of data 130, 132, 138 provided or displayed on the display screen 124. In another non-limiting aspect of the disclosure, a second subset of data 142 is shown in a "highlighted" or "indicating" state, that is, different from the majority of data 130, 132, 138 provided or displayed on the display screen 124.

In non-limiting aspects of the disclosure, the second subset of data 142 is configured, designed, arranged, or the like, to call attention or draw attention to the second subset of data 142. In this sense, the second subset of data 142 can be "highlighted" or "identified" using contrasting or different colors, formatting, blinking, additional indicators (i.e. exclamation points, asterix, etc.), or the like, compared with the first subset of data 140. For instance, in one non-limiting example, the second subset of data 142 can appear in bolded red text, while the first subset of data 140 can appear in white or black text. In another non-limiting example, the second subset of data 142 can appear in inverted colors or contrast, compared with the first subset of data 140. In non-limiting aspects of the disclosure, the second subset of data 142, or highlighting, identifying, or the like, can indicate an error, a deviation from expecting operating status or parameters, or another status indication, while the first subset of data 140 can indicate normal operational status of the respective underlying data 130, 132, 138 or functionality represented by the data 130, 132, 138. Non-limiting aspects of the disclosure can be included wherein, for instance, the indication or formatting of a second subset of data 142 can coincide with audible or additional visual alerts.

Figure 4:
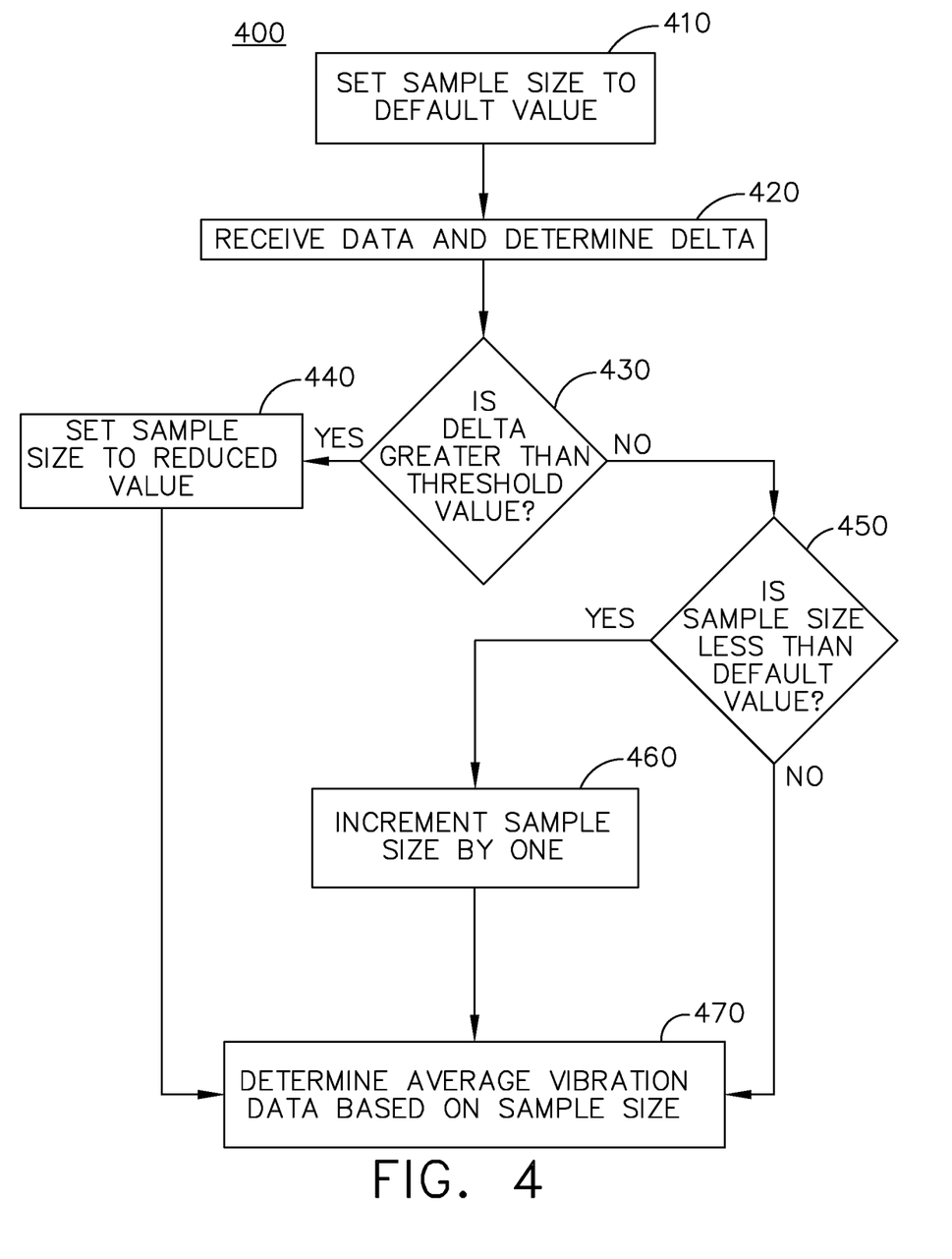
FIG. 4 is an example flow chart diagram demonstrating a method of determining an average of data values, in accordance with various aspects described herein.

FIG. 4 illustrates one non-limiting example of a method 400 of determining or averaging a set of data, in accordance with aspects described herein. In one non-limiting instance, the example method 400 can determine, compute, calculate, or otherwise conclude a set or subset of data provided to and displayed by the display screen 124 of FIGS. 2 and 3.

As shown in FIG. 4, the method 400 begins by setting a sample size or predetermined number of data points for averaging a set of data, such as vibration data, to a default value, at 410. In one non-limiting example, the default value can be eight, such that the average vibration data is based on an averaging of the eight most recent vibration data values. Non-limiting aspects of the disclosure can be included wherein the sample size is one of a range or a predetermined number of data points. Next, the method 400 continues by receiving, such as in the controller module 92, a new data value, reading, sensing, or measurement, such as vibration data received from one of the set of vibration sensors, at 420. In addition to receiving the new data value, the controller module 92 can calculate, determine, or compare the new data value with the most-recent previous data value received, and determine a change or "delta" between the most-recent previous data value received and the new data value. Further non-limiting aspects of the disclosure can be included wherein a "delta" can include a change or a derivative of a change between the new data value and a previously determined or calculated average data value.

Next, the method 400 compares the delta with a threshold value or threshold delta value, to determine if the comparison satisfies the threshold value, at 430. This can be done by the controller module 92. As used herein, the term "satisfies" is used to mean or define that the delta satisfies the threshold value, such as being equal to or greater than the threshold value, or being outside of a threshold value range. It will be understood that such a determination may easily be altered to be satisfied by a positive or negative comparison or a true or false comparison. Additionally, while "equal to or greater than" is described with reference to satisfying the threshold value, aspects of the disclosure can be included wherein, for instance, only delta values greater than (not equal to) the threshold value satisfying the comparison. In one non-limiting aspect of the disclosure, the threshold value or delta threshold value can be 38.1 micrometers (1.5 millionths of an inch) peak displacement. Additional threshold values are envisioned. In another non-limiting aspect of the disclosure, the absolute value of the actual delta can be compared with only a positive threshold value. In yet another non-limiting aspect of the disclosure, the threshold value or delta threshold value can include dissimilar plus and minus threshold values (e.g. threshold value of positive 38.1 micrometers peak displacement and a threshold value of negative 30 micrometers peak displacement). While "peak displacement" is described (i.e. with reference to a non-displacement or zero displacement value), aspects of the disclosure can be included wherein, for example, threshold values are described with reference to a peak-to-peak displacement value.

If the controller module 92 determines the delta satisfies the threshold value ("YES" branch of 430), the method 400 can continue to set or reset the sample size to a reduced value, at 440. In one non-limiting aspect of the disclosure, the reduced value can equal two. The method 400 can then continue to a determining at 470, wherein the controller module 92 determines the average vibration data based on the sample size set at 440, such as an averaging of the two most recent vibration data values. In this non-limiting example, the method 400 can ensure that at least two data points, samples, or values are utilized for the averaging, and wherein the at least two data points are the current value and the next most recent or prior value. The averaged vibration data can be, for example, displayed or updated on the display screen 124.

If the method 400 determines the delta does not satisfy the threshold value ("NO" branch of 430), the method continues to 450. In 450, the method 400 or the controller module 92 determines whether the current sample size is less than the default sample size value, defined at 410. If the current sample size is equal to the default sample size ("NO" branch at 450), the method 400 continues to 470, wherein the method 400 or controller module 92 determines the average vibration data is based on the current sample size, such as an averaging of the eight most recent vibration data values. The averaged vibration data can be, for example, displayed or updated on the display screen 124.

If the current sample size is less than the default sample size ("YES" branch at 450), the method 400 continues to 460, wherein the current sample size is incremented by one. The method 400 then continues to 470, wherein the method 400 or controller module 92 determines the average vibration data based on the current sample size, such as an averaging of a number of most recent vibration data values equal to the current sample size. In this sense, the method 400 at 450, 460, and 470 can include increasing the number of data points or sample size used in a subsequent averaging when the delta is below the reference threshold value, as determined at 430. As explained, the number of data points or sample size can be incrementing by one on each subsequent averaging until a threshold is reached. In this sense, the number of data points can be capped at a maximum or default value, or capped threshold, as determined and enforced at 450. The averaged vibration data can be, for example, displayed or updated on the display screen 124.

Non-limiting aspects of the method 400 can include a repeating process wherein the method 400 returns to 420 to receive new data, after the determined average is completed at 470. In one non-limiting aspect, the repeating includes continuously repeating, continuously repeating at set time intervals, or the like.

The method 400 described herein can operably or effectively provide or enable a method of dynamically averaging a set of data values over a period of time. For example, a sufficiently new and varied data value (compared with the prior data value(s), as described by the delta and threshold value satisfaction above) can operably reduce the sample size utilized for the averaging. In one non-limiting aspect, the reduced sample size can operably or effectively provide or enable an increased or faster "recovery" reflective of the actual data values received, when compared with a set or standard sample size. For instance, a "jump," a "step," or a difference in a new or current data value received would take a longer period of time when averaged with the eight most recent values (e.g. sample size of eight), when the most recent values do not include a similar "jump." This can be defined as a "recovery time." Contrast this with aspects of the disclosure, wherein a "jump" or difference in a new or current data value received, wherein the "jump" is greater than the threshold value, as defined herein, would have a faster recovery time, as only the two most recent values would be averaged together. Following the faster recovery time, the method 400 described would repeatedly increase the sample size in each of the following repeated cycles (assuming no additional satisfying "jumps" occur), until the sample size returned to the default value.

Figure 5:
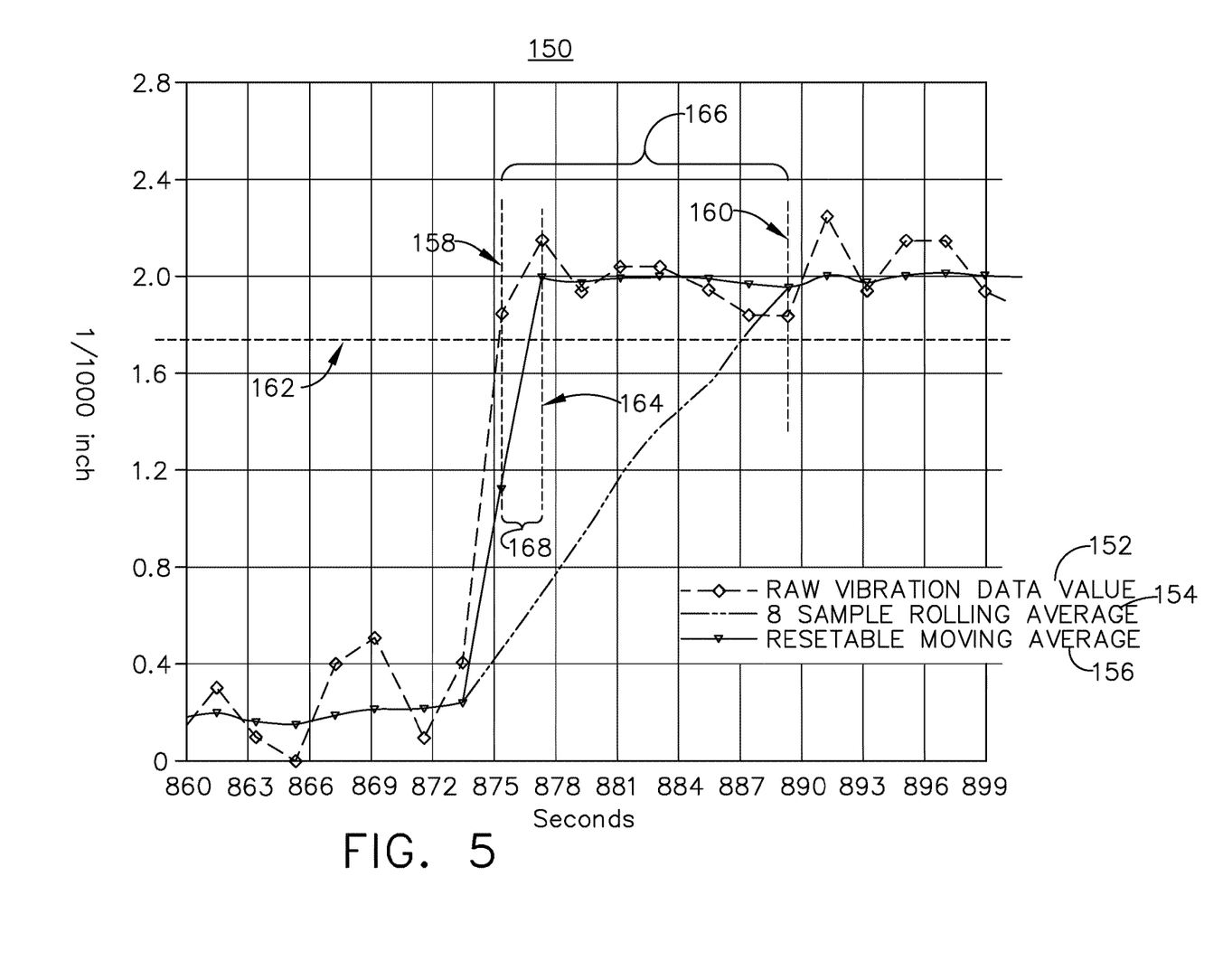
FIG. 5 is a series of plot graphs showing operation of method of FIG. 4, in accordance with various aspects described herein.

FIG. 5 illustrates a graph 150 of a series of plots demonstrating various averaging methods. As shown, a first series of plots can include a raw vibration data value 152, for example, received by the controller module 92 by the at least one vibration sensor 90. A second series of plots can include an eight-sample rolling average 154 that demonstrates a determined average over the prior eight raw data samples. A third series of plots can include a dynamic or resettable moving average 156, as described by the method 400, above.

As shown, at a first period of time, denoted 158, the raw vibration data value 152 steps to a significantly higher value. The eight-sample rolling average 154 tracks the increase in this, and subsequently higher raw vibration data values 152, over a period of time, and reaches an averaged vibration data value proximate to the higher raw vibration data values at a second period of time, denoted 160. The time between the first period of time 158 and the second period of time 160 can define a first recovery time 166 needed to reflect an accurate average of the vibration data using the eight-sample rolling average 154. While the illustrated example shows the raw vibration data value 152 stepping to a significantly higher value, non-limiting aspects of the disclosure can be included wherein the raw vibration data value 152 can step to a significantly lower value between corresponding periods of time, and corresponding averaged vibration data value tracks the step to the lower raw vibration data values.

The dynamic or resettable moving average 156 defined by method 400, is also illustrated in response to the same raw vibration data values 152. When the raw vibration data value 152 "jumps" to a significantly higher value at the first period of time 158, and assuming the "jump" is greater than the threshold value or delta threshold value described above, the resettable moving average 156 is able to track the increase in the average vibration data much quicker by utilizing fewer sample sizes or data points. In the case of the resettable moving average 156, the average vibration data value is proximate to the higher raw vibration data values at a third period of time, denoted 164. The time between the first period of time 158 and the third period of time 164 can define a second recovery time 168 needed to reflect an accurate average of the vibration data. As shown, the second recovery time 168 is less than, or quicker than, the first recovery time 166.

Stated another way, aspects of the disclosure described herein allow for or enable a dynamic averaging method that provides a reduced sample size when differences between successive or relative calculated values (e.g. the delta) are greater than a delta threshold value. When the delta is greater than the delta threshold value, aspects of the disclosure reduce the number of data samples or sample points and average only the reduced number of recent data samples, which allows for the averaged value to track or step with the raw data values faster, or with a reduced latency or "recovery time" as described. The reduced latency or recovery time is described compared to conventional averaging methods that use a set number of data samples which dilute the recovery time (i.e. average it over a larger number of samples) of a stepped current data value. When the delta is within or less than a delta threshold value, the dynamic averaging method allows or enables a growing sample size to smooth out the transient differences over a period of time.

The reduced latency or recovery time described herein can provide faster or more accurate averaging to track the stepped raw data values, compared with convention averaging methods. For example, also shown in the graph 150 is an arbitrary predetermined threshold 162, for example, indicating a level of "high" or undesirable vibration. When utilizing the eight-sample rolling average 154, the average vibration value does not reach or satisfy the predetermined high vibration threshold 162 until approximately the 887th second. In contrast, when utilizing the resettable moving average 156, the average vibration value would satisfy the predetermined high vibration threshold 162 at approximately the 877th second; approximately ten seconds faster. The effect of satisfying the predetermined high vibration threshold 162 faster can, in turn, provide indication, highlighting, alerting, or the like, to a pilot much faster than conventional rolling averaging. In one non-limiting aspect of the disclosure, the highlighting can include by way of the second subset of data 142 on a display screen 124, as illustrated in FIG. 3.

Figure 6:
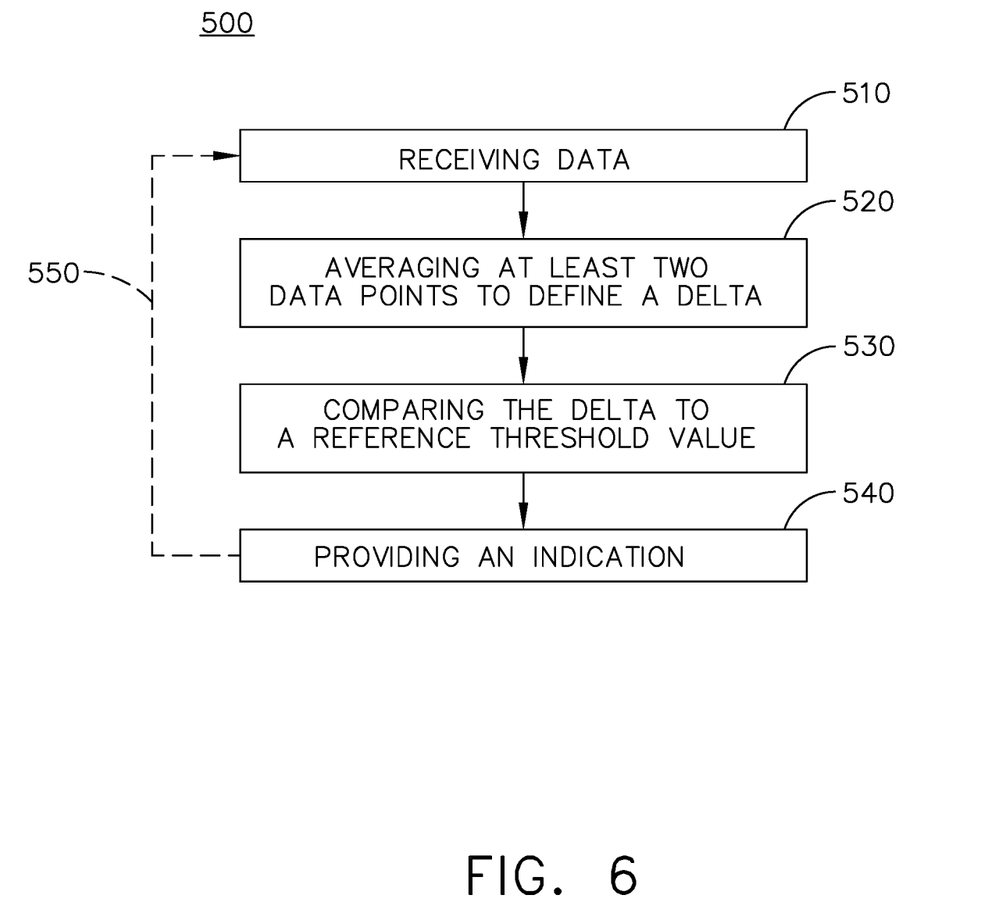
FIG. 6 is another example flow chart diagram demonstrating a method of displaying data in an aircraft, in accordance with various aspects described herein.

FIG. 6 illustrates another non-limiting example method 500 of determining or averaging a set of data, in accordance with aspects described herein. In one non-limiting instance, the example method 500 can include receiving data, from at least one sensor, such as one of the set of vibration sensors 90 operably coupled to the aircraft, to define received data, at 520. Next, the method 500 can include averaging, by the control module 92, at least two data points of the received data to define a delta and averaged vibration data, at 520. Non-limiting aspects of the method 500 can be included wherein the number of the at least two data points, or more than two data points, can be determined by way of 440, 450, 460, or a combination or subset thereof.

The method 500 then continues to comparing, by the control module 92, the delta to a reference threshold value, at 530. The comparing at 530 can be similar to the comparing at 430 of method 400. The method 500 then provides an indication, on a display of the aircraft, of the averaged vibration data based on the comparing, at 540. Non-limiting aspects of the method 500 can be included wherein the method 500 repeats (for instance via path 550) the receiving data at 510, the averaging at 520, the comparing at 530 and the providing an indication at 540.

Figure 7:
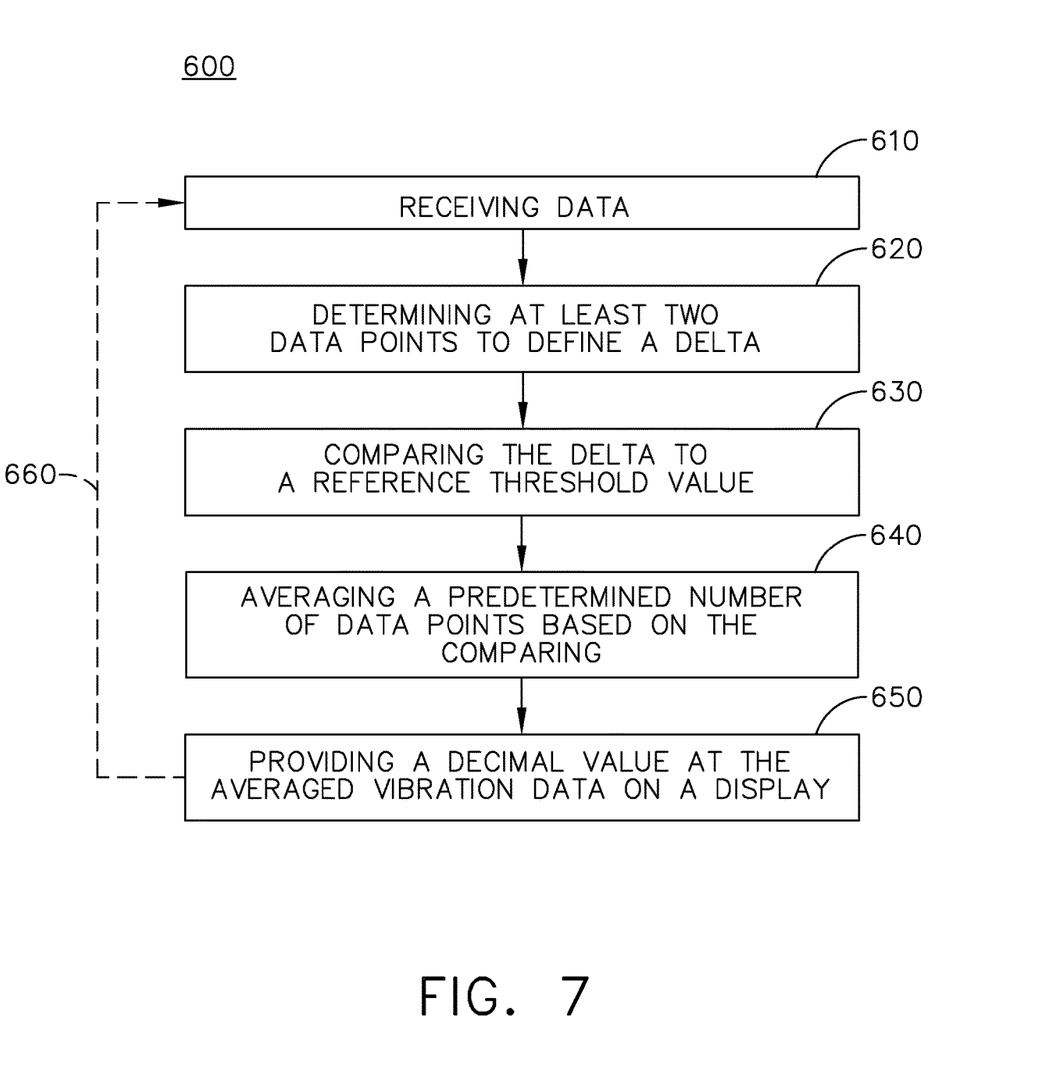
FIG. 7 is yet another example flow chart diagram demonstrating a method of displaying data in an aircraft, in accordance with various aspects described herein.

FIG. 7 illustrates yet another non-limiting example method 600 of determining or averaging a set of data, in accordance with aspects described herein. In one non-limiting instance, the example method 600 can include receiving data, from at least one sensor, such as the set of vibration sensors 90 operably coupled to the aircraft, at 610. Next, the method 600 can include determining, by the control module 92, a difference between at least two data points of the received data to define a delta, at 620. In another non-limiting aspect, 620 can include determining a difference between the current or new data value and a previously determined or calculated average data value. Non-limiting aspects of the method 600 can be included wherein the number of the at least two data points, or more than two data points, can be determined by way of 440, 450, 460, or a combination or subset thereof of method 400.

The method 600 then continues to comparing, by the control module 92, the delta to a reference threshold value, at 630. The comparing at 630 can be similar to similar to the comparing at 430 of method 400. Next, the method 600 proceeds to average, by the control module 92, a predetermined number of data points based on the comparing at 630 to define averaged vibration data, at 640. The method 600 continues by providing a decimal value, on a display of the aircraft such as the display screen 124, of the averaged vibration data, at 650. Non-limiting aspects of the method 600 can be included wherein the method 600 repeats (for instance via path 660) at 610-650 to provide a rolling averaged vibration data.

The sequence depicted in method 400, 500, 600 is for illustrative purposes only and is not meant to limit the method 400, 500, 600 in any way as it is understood that the portions of the method 400, 500, 600 can proceed in a different logical order, additional or intervening portions can be included, or described portions of the method 400, 500, 600 can be divided into multiple portions, or described portions of the method 400, 500, 600 can be omitted without detracting from the described method 400, 500, 600.

The aspects disclosed herein provide a method and apparatus for displaying data in an aircraft by way of dynamic averaging of data over a period of time. The technical effect is that the above described aspects enable faster tracking or "recovery" of averaged data relative to the raw data values when the difference between successive data values exceeds a threshold value. One non-limiting advantage that can be realized in the above aspects is that the above described aspects have superior averaging capabilities compared with conventional averaging methods. Another non-limiting advantage that can be realized in the above aspects is that the above described aspects have reduced latency in determining an accurate averaged data value over a shorter period of time, compared with conventional averaging methods. For example, a faster recovery of the averaged data value can be reached by dynamically adjusting the sample size or number of data points. In one non-limiting example of a large variation between data points (i.e. larger than the threshold value), the dynamic averaging can track the raw data values faster, or with minimal latency. By tracking the raw data values faster, the averaged vibration data can in turn, enable alerting the pilot that a high vibration threshold has been satisfied much quicker or rapidly than conventional averaging methods. Another non-limiting advantage of the above described methods allows for the incrementing of the sample size or number of data points over successive iterations of the averaging method, providing or enabling the "smoothing" of raw data jitters by enabling larger sample sizes over time.

Non-limiting examples of vibration-causing sources or shifts in vibration from various sources on an aircraft can include, but are not limited to, icing on one or more aircraft components, or foreign object damage.

Many other possible aspects and configurations in addition to that shown in the above figures are contemplated by the present disclosure. To the extent not already described, the different features and structures of the various aspects can be used in combination with others as desired. That one feature cannot be illustrated in some of the aspects is not meant to be construed that it cannot be, but is done for brevity of description. Thus, the various features of the different aspects can be mixed and matched as desired to form new aspects, whether or not the new aspects are expressly described.

This written description uses examples to describe the disclosure, including the best mode, and also to enable any person skilled in the art to practice the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of displaying data in an aircraft, the method comprising:
   receiving data, from at least one sensor operably coupled to the aircraft, relevant to vibration of the aircraft during flight to define received data;
   averaging, by a control module, at least two data points of the received data to define a delta and averaged vibration data;
   comparing, by the control module, the delta to a reference threshold value;
   providing an indication, on a display of the aircraft, of the averaged vibration data based on the comparing; and
   repeating the receiving data, averaging, comparing, and providing an indication and where when the delta is above the reference threshold value the averaged vibration data is based on two data points and when the delta is below the reference threshold value subsequent averaging includes more than two data points.

2. The method of claim 1 wherein the repeating comprises continuously repeating.

3. The method of claim 2 wherein the continuously repeating comprises continuously repeating at set time intervals.

4. The method of claim 1, further comprising increasing the number of data points used in a subsequent averaging when the delta is below the reference threshold value.

5. The method of claim 4, further comprising capping the number of data points used in the subsequent averaging at a capped threshold.

6. The method of claim 5, further comprising counting a number of data points used in the averaging and incrementing by one on each subsequent averaging until the capped threshold is reached.

7. The method of claim 1, wherein the at least two data points are a current value and a most recent value.

8. The method of claim 1, wherein the reference threshold value is greater than 38.1 micrometers peak displacement.

9. The method of claim 1, wherein the received data is from at least one accelerometer.

10. A method of displaying data in an aircraft, the method comprising:
receiving data, from at least one sensor operably coupled to the aircraft, relevant to vibration of the aircraft during flight to define received data;
determining, by a control module, a difference between at least two data points of the received data to define a delta;
comparing, by the control module, the delta to a reference threshold value;
averaging, by the control module, a predetermined number of data points based on the comparing to define averaged vibration data, wherein the predetermined number of data points is incremented when the delta is below the reference threshold value; and
providing an indication, on a display of the aircraft, of the averaged vibration data.

11. The method of claim 10, wherein the at least two data points are a current value and a most recent value.

12. The method of claim 10, wherein the reference threshold value is greater than 38.1 micrometers peak displacement.

13. The method of claim 10, wherein the predetermined number of data points is two when the delta is above the reference threshold value.

14. The method of claim 10 wherein the predetermined number of data points is one of a range of a predetermined number of data points.

15. The method of claim 14, further comprising determining the one of a range of predetermined number of points.

16. A method of displaying data in an aircraft, the method comprising:
a) receiving data, from at least one sensor operably coupled to the aircraft, relevant to vibration of the aircraft during flight to define received data;
b) determining, by a control module, a difference between at least two data points of the received data to define a delta;
c) comparing, by the control module, the delta to a reference delta threshold value;
d) averaging, by the control module, a predetermined number of data points based on the comparing to define averaged vibration data, wherein the predetermined number of data points is incremented when the delta is below the reference delta threshold value;
e) providing a decimal value, on a display of the aircraft, of the averaged vibration data; and
f) repeating a)-e) to provide a rolling averaged vibration data.

17. The method of claim 16, further comprising determining when the averaged vibration data is above a predetermined threshold.

18. The method of claim 17, further comprising providing an alert to indicate the determined vibration.

19. The method of claim 16, further comprising counting a number of data points used in the averaging and incrementing by one on each subsequent averaging until a threshold is reached.

* * * * *